Nov. 24, 1931.  A. SCHMIDT  1,832,948

BATTERY CELL TESTING MACHINE

Filed Oct. 9, 1930  2 Sheets-Sheet 1

Inventor
ALFRED SCHMIDT
By his Attorney

Nov. 24, 1931.  A. SCHMIDT  1,832,948
BATTERY CELL TESTING MACHINE
Filed Oct. 9, 1930  2 Sheets-Sheet 2

Inventor
ALFRED SCHMIDT
By his Attorney

Patented Nov. 24, 1931

1,832,948

UNITED STATES PATENT OFFICE

ALFRED SCHMIDT, OF WEEHAWKEN, NEW JERSEY

BATTERY CELL TESTING MACHINE

Application filed October 9, 1930. Serial No. 487,443.

This invention relates to new and useful improvements in a battery cell testing machine.

The invention has for an object the provision of a machine of the class described adapted to receive a continuous line of battery cells, test the cells, and discharge them at two points so that cells which test above the test point discharge at one of the points, and cells which test below the test point discharge at the other of the points, providing for the assorting of first rate and second rate cells.

The invention also proposes the use of an ammeter provided with an adjustable hand with contacts for setting to a predetermined test point to accomplish the assorting mentioned in the previous paragraph.

The invention has for another object the provision of a movable cell carriage for uniformly holding a plurality of cells to be tested and assorted, and means for moving said carriage in a continuous path during the testing and assorting of the cells.

The invention has for another object the provision of catches on the carriage, mentioned in the previous paragraph, for selectively holding the cells, and each of the catches includes a movable control for opening the catches as controlled by a stationary cam to accomplish the assorting before mentioned.

Another object of this invention is to provide means for individually testing each cell on the carriage before mentioned, and moving the control before mentioned when testing a poor cell for causing the discharge of the cells at the second point.

Another object of this invention is to provide a cam for operating the control before mentioned to open the catches for receiving cells and to close the catches during the carrying of the cells, and to open the catches past the testing point to discharge good cells and to open other of the catches at their second positions to discharge poor cells at the second point.

The invention also proposes the provision of a pointer carrying a contact engageable with a contact on the hand of an ammeter and adjustable to various positions to set the test point of the ammeter, and means for controlling one discharge of battery cells if the circuit is broken at these points by the ammeter moving to a higher reading than the set reading for assorting better than the set reading cells, and another discharge for cells poorer than the set reading assorted in the event that the ammeter hand does not move to break the circuit between said contacts.

The invention has for a further object the provision of a mechanical discharging means for the discharge of the cells which test better than the set reading, and an electrical change controlling the mechanical discharge for the discharge at a different point of cells testing poorer than the set reading. Thus, since the great majority of the cells are good, for example 95%, just mechanical means is depended upon for accomplishing the greater portion of the assorting, and it is only in the event that the cells are poor, approximately 5%, that electrical energy is used for causing a change which thereafter permits a mechanical discharge to discharge the poorer cells.

The invention also proposes the provision of an adjustable finger on an ammeter and carrying a contact engageable with a contact on the hand of the ammeter for holding the hand adjusted on the ammeter scale to the test reading, a circuit including the latter two contacts and a coil of a relay, and another circuit including the switch of said relay and a solenoid for moving controls which determine the mechanical discharge of the battery cells at one or the other of the points before mentioned, and said latter circuit capable of carrying a larger amperage than passes through the contacts of said hand and finger for powerful control of said solenoid and also including a switch, and means for closing said latter switch immediately after the positive terminal of a cell makes contact with a long contact in the path of motion of the cells moving on the carriage before mentioned, said long contact being included in a circuit controlling the reading of said ammeter.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

The battery cell testing machine comprises a movable cell carriage 10 for uniformly holding a plurality of battery cells 11, means for moving said carriage 10 in a continuous path, catches 12 on said carriage 10 for selectively holding said cells 11 and each catch including a movable control 13 for opening the catch, means for individually testing each cell 11 on said carriage and moving the control 13 when the test indicates a poor cell, and a cam 14 for operating the controls 13 to open the catches for receiving cells to close the catches during the carrying of the cells and to open the catches past the testing point to discharge good cells and to open the catches at other positions to discharge poor cells at a second point of discharge.

Figure 1:
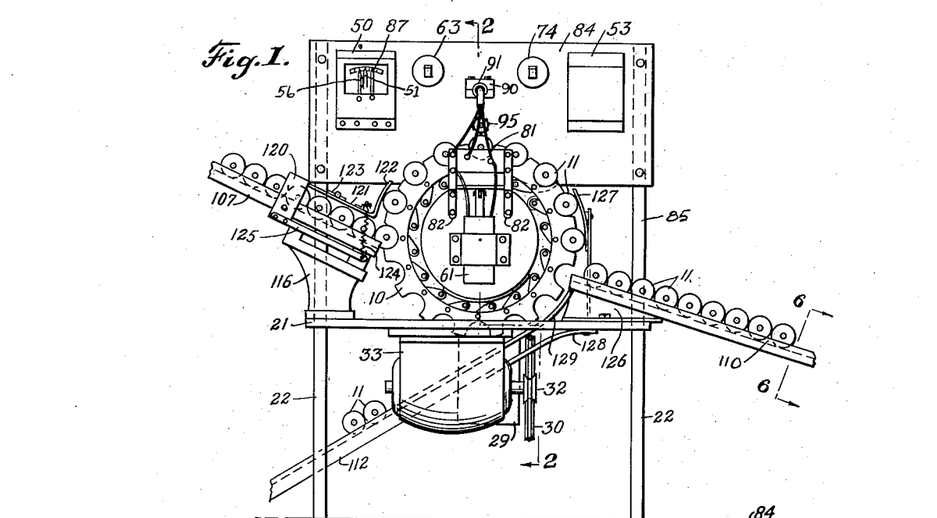
Fig. 1 is a front elevational view of a machine constructed according to this invention.
Figure 2:
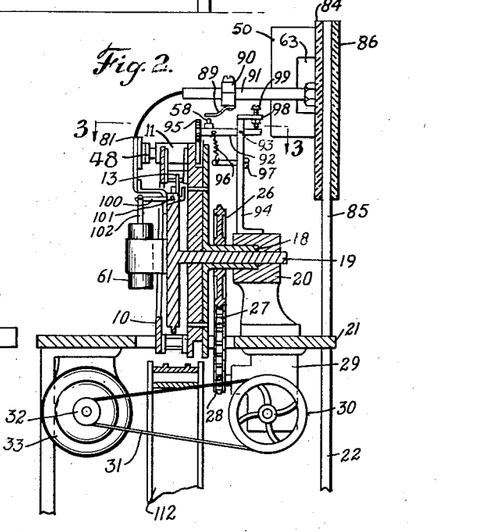
Fig. 2 is a sectional view taken on the line 2—2 of Fig. 1.
Figure 3:
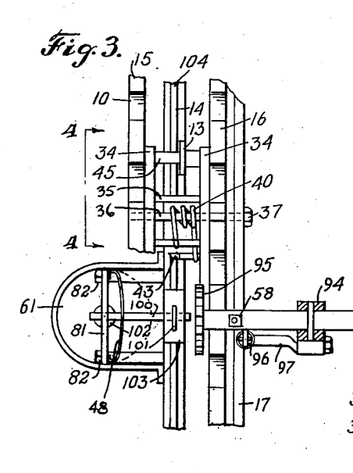
Fig. 3 is a fragmentary horizontal sectional view taken on the line 3—3 of Fig. 2.
Figure 4:
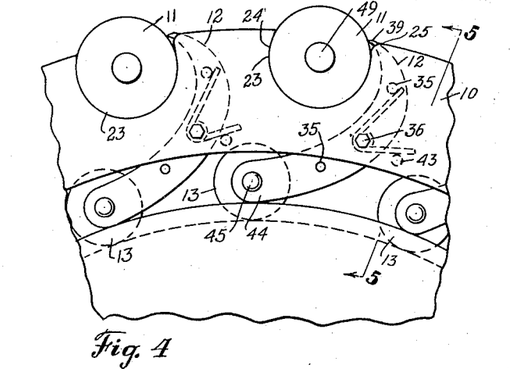
Fig. 4 is a fragmentary enlarged detailed elevational view looking in the direction of the line 4—4 of Fig. 3.

The movable cell carriage 10 comprises a front ring 15 positioned in a vertical plane and spaced from a rear vertical disc 16, a plate 17 being rigidly attached upon the disc 16 and being provided with a hub 18 engaged upon an axle 19 stationarily supported by a standard 20. The standard 20 is mounted upon a table top 21 supported by a plurality of legs 22. The ring 15, the disc 16 and the plate 17 are formed with a plurality of peripheral substantially semi-circular openings 23 for receiving the cells 11 transversely across the periphery of the carriage. The left hand sides of the openings 23 are shaped truly circular so that the cells 11 fit flush against these parts, as indicated by reference numeral 24, which indicates the point of close contact, while the right hand sides of the openings 23 are curved away from the cell 11, indicated by the reference numeral 25. It is intended that the carriage 10 rotate clockwise as viewed in Figs. 1 and 4 so that the cells may snugly rest against the left hand sides of the openings 23, and upon release of the catches 12 which are arranged upon the right hand sides of the cells to guide the cells to discharge from points hereinafter mentioned. The openings 23 preferably should be equally spaced from each other.

The means for moving the carriage 10 in a continuous path comprises a sprocket gear 26 attached upon the hub 18 and connecting with a sprocket chain 27 engaged over a sprocket pinion 28 upon the driver shaft of a worm reduction unit 29 which is attached upon the bottom of the table 21. The driven shaft of the reduction unit 29 is provided with a pulley 30 connected with a belt 31 engaging over a small pulley 32 upon a shaft of an electrical motor 33 mounted upon the bottom of the table 21. The direction of rotation of the motor is such that the sprocket 26 turns clockwise for rotating the carriage in the clockwise direction before mentioned.

Each of the catches 12 comprise a pair of spaced fingers 34 of exactly the same shapes and held in spaced relations by rods 35 rigidly connected between these parts, one of said pair of fingers 34 being flush against the disc 16 and the other being flush against the ring 10. A stud 36 projects from the ring 10 and engages through apertures in the fingers 34 and through an aperture in the disc 16 and the plate 17, and is provided at its free end with a holding nut 37. A tube 38 is engaged upon the portion of the stud 36 which is between the fingers 34. The studs of the various catches and the catches themselves constitute the means for holding the ring 10 spaced from the disc 16.

The outer ends 39 of the fingers 34 are pointed and are arranged on the right hand side of the cell 11 for engaging the cell and holding it in place. This is very clearly shown in the enlarged view of Fig. 4. A coaxial spring 40 is mounted upon the tube 38 and has one end 41 engaging against one of the rods 35, and its other end 42 against a pin 43 projecting from the disc 16 so as to urge the pointed ends 39 of the fingers against the side of the cell. The inner ends 44 of the fingers carry a transverse pin 45 which supports the control 13. This control is merely a roller having a hub portion 46 for holding it properly spaced from one of the fingers 34. The roller may slide along on the pin 45 to a second position, indicated by the dot and dash lines 47 in Fig. 5, to constitute the second position of the control previously mentioned. The roller 13 acts against the cam 14, and when the cam presses up to raise the roller it pivots the catch fingers 34 about the stud 35 against the action of the spring 40 so as to free the cells 11.

The means for individually testing each cell 11 on the carriage 10 and moving the control 13 when a cell tests poor to the second position of the control makes use of a circuit including a long contact 48 for connecting for a short period of time with the positive pole 49 of one of the cells, as the cell passes the contact and constitutes the particular cell under test, the cell itself, and an ammeter 50 with an indicating hand 51. A second circuit including the core 52 of a relay 53, a contact 54 on the indicating hand 51, a contact 55 on a hand 56 so that the latter contact 55 holds the indicating hand 51 at the testing reading upon the scale 57 of the ammeter, a switch 58 closable mechanically by the cell 11 under test a short time after the positive pole 49 of the cell engages the long contact 48, and a battery 59, is also made us of. A short circuit including a switch 60 of the relay 53, said battery 59 and a solenoid 61 for mechanically moving the control element 13 is also provided.

The first circuit mentioned in the previous paragraph can be traced by starting at the long contact 48, continuing along lead 62 to switch 63, then fuse 64, shunt 65, one of the poles of the ammeter 66, through the ammeter, out from the other pole 67 of the ammeter, back through the shunt 65, then along lead 68 to the ground 69 which electrically connects with the negative or casing of the cell under test. The cell under test provides the current which causes the hand 51 of the ammeter to move and indicate the strength of the cell.

The second circuit mentioned may be traced from the negative of battery 59, along lead 70 to the point 71 on the relay 53, then continuing along lead 72 to the contact 54 on the hand 51 of the ammeter, then through to the contact 55 on the hand 56 mounted on the ammeter casing, then from the hand 56 along lead 73 to the switch 74, then through the coil 52 of the relay, next along lead 75 to the switch 58, and then to the ground connection 76. Obviously, when the switch 58 is closed mechanically by the passing of the battery cell, and if the contacts 54 and 55 remain engaged with each other, current can then flow through the circuit to energize the core of the relay and cause the relay to close its switch 30 for closing the short circuit mentioned. But, in the event that the circuit is broken by the contacts 54 and 55 separating, then the relay will not be energized so that the short circuit will remain opened.

The third circuit may be traced from the negative of the battery 59, along lead 70, through the switch 60 of the relay 53, then along lead 77 to the solenoid 61, and there to the ground connection 78. In the event that the switch 60 closes, the solenoid will be energized so that its core moves. A fuse 79 connects with the positive terminal of the battery 59 and then with the ground connection 80.

Figures 6, 7, 8, 9:
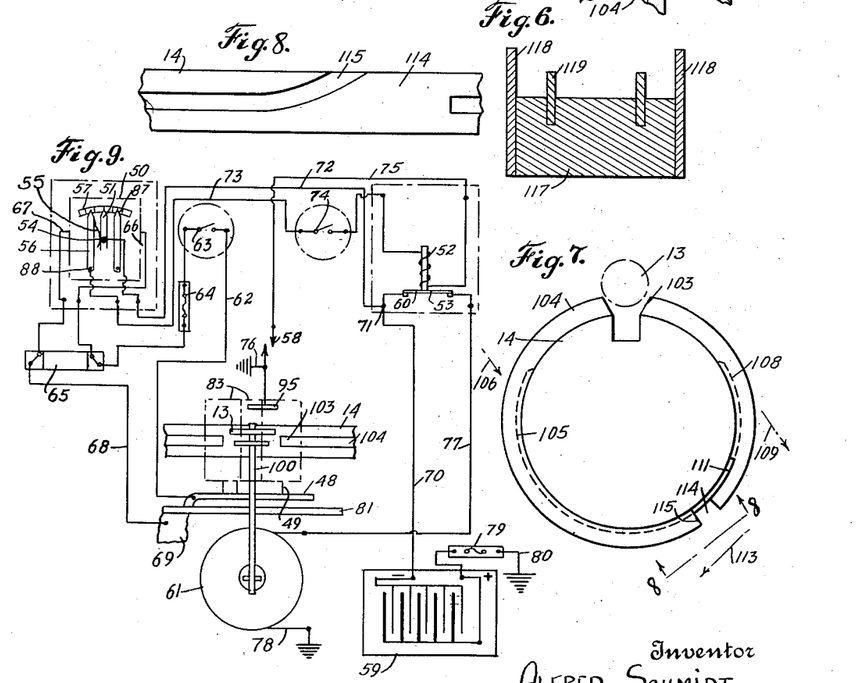
Fig. 6 is a sectional view taken on the line 6—6 of Fig. 1.
Fig. 7 is an elevational view of the control cam of the device shown in Figs. 1 and 2, and a schematic showing of important parts and their relations with the cam.
Fig. 8 is a fragmentary elevational view looking in the direction of the line 8—8 of Fig. 7.
Fig. 9 is a schematic wiring diagram of the electrical features of the machine.

The long contact 48 is mounted upon an insulation plate 81 supported by a pair of parallel braces 82 which connect with the stationary cam 14. The plate 81 is parallel to the cam and the contact 48 parallel to the plate so that as the carriage 10 passes the positive terminal may engage for a short period of time with the contact 48. In Fig. 9 dot and dash lines 83 indicate two positions of the battery cell during its travel across the contact 48. In the position to the left, the positive terminal of the cell connects with the contact 48, but the body of the cell has not reached a position to operate the switch 58. In the second dot and dash position, that is, the one to the right, the positive terminal of the cell still remains in contact with the contact 48, and the body of the cell closes the switch 58. A panel 84 is supported by rods 85 which connect with the table 21. An insulation back cover 86 engages across the rods 85 so as to cover the back of the panel 84. Various electrical instruments before mentioned are mounted upon the panel 84, and the wiring extends through the panel and is hid between the panel and the covering plate 86. An inspection of Fig. 1 will show that the ammeter 50, the switches 63 and 74, and the relay 53 are all mounted upon the panel 84. The ammeter 50 is shown provided with an additional pointer 87 which is mounted upon the ammeter case and arranged so as to frictionally assume various positions. This pointer 87 is located on the opposite side relative to the hand 51 as the pointer 56 so that when the hand 51 of the ammeter swings away from the pointer 56 indicating a good cell, it is arrested from swinging very far so that too much time is not consumed in its returning back into its contacting position. This allows the machine to run at high speed in that it returns very rapidly back into its contacting position and the machine is ready to test the next cell.

The contact 54 on the ammeter hand 51 merely is a pin which projects outwards so as to be engageable against the contact 55 upon the finger 56. The contact 55 is merely a spring. Screws 88 connect the bottom ends of the fingers 56 and 87 with the ammeter casing and serve to frictionally hold the fingers in any set positions. The details of this construction is not shown, but the screws should be so arranged that they may be rotated with a screw driver for changing the positions of the fingers. When the finger 56 is adjusted to a certain point on the scale 57, its contact 55 acts against the pin 54 and moves the ammeter hand 56 to read upon the scale 57. It holds this position irrespective whether a current runs through the ammeter. Of course, if a current runs through the ammeter which is of lesser strength than the reading to which the hand 51 of the ammeter points, then the ammeter hand will maintain the contact. Only if this current is stronger than the reading indicated, will the ammeter hand swing off and be stopped from swinging too far by the finger 87.

The switch 58 constitutes a lower contact and an upper contact. The upper contact is mounted upon a spring support 89 connected with a clamp 90 upon a tubular support 91 mounted upon the panel 84. The lower contact of the switch 58 is mounted upon a horizontal rod 92 which is pivoted at 93 upon a support 94 mounted upon the standard 20. A star wheel 95 is rotatively mounted upon the rod 92 and is in the path of motion of the bodies of the battery cells 11. A spring 96 is connected with the rod 95 and with a stud 97 mounted upon the brace 95 so as to normally urge the arm 92 downwards at one of its ends to urge the star wheel 95 against the bodies of passing cells, and to hold the switch 58 in its opened position. When a cell passes, it engages the star wheel to pivot up the rod 92 and close the switch 58. A stop is provided for restraining the spring 96 from lowering the rod 91 too far at one of its ends. This stop comprises a bar 98 overhanging the rear end of the rod 92 and supporting an adjustable stop screw 99 engageable with the rod 92 to accomplish the stopping. In the right hand dot and dash position 83 of the battery cell indicated in Fig. 9, the cell would lift the star wheel 95 to cause the switch 58 to close.

Figure 5:
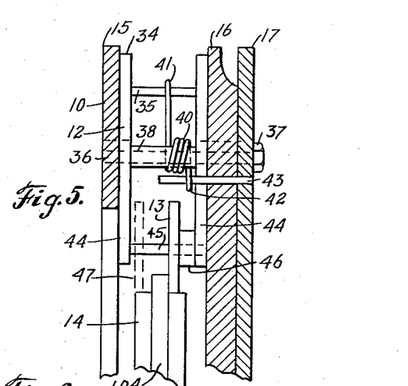
Fig. 5 is a fragmentary sectional view taken on the line 5—5 of Fig. 4.

The mechanical means for moving the control element 13 upon operation of the solenoid 61 comprises a lever 100 pivotally mounted intermediately at 101 upon the cam 14 and having an upward extending rear end engageable to the rear of the control wheel 13 so that when the lever 100 is pivoted by the solenoid 61, this extended end will move the control wheel 13 forwards to the position indicated by the dot and dash lines 47 in Fig. 5. The core 102 of the solenoid 61 connects with the lever 100. This solenoid is of the type wherein its plunger is normally extended by an internal spring, not shown on the drawings. When the solenoid is energized, its core is drawn downwards and this causes the lever 100 to pivot to accomplish the moving of the control element 13 as before mentioned. The cam 14 is formed with a cutout portion 103 so that the control roller 13 may move across from the position shown in full lines in Fig. 5 to the position indicated by the dot and dash lines.

The cam 14 comprises a vertical disc positioned within the ring 10. It is formed with a peripheral flange 104 which divides its periphery into a front track and a rear track. The rollers 13 normally travel along the rear track and it is only when the rollers are moved to the position indicated by the dot and dash lines 47 in Fig. 5 that they pass through the cutout 103 in the cam so as to travel along the front track. The cam 14 is fixed upon the axle 18 so as to maintain a stationary position. The front and rear tracks of the cam are provided with raised portions to raise the rollers 13 and cause the catches 12 to move to disengaged positions. Examining Fig. 7, these raised portions may be studied. The rear track has a raised portion 105 extending from the bottom completely along to the left hand side. When rollers 13 pass over this track, they maintain the opened position. The dot and dash lines 106 in Fig. 7 indicate the line of discharge of a chute 107 for supplying cells to be discharged to the carriage 10. It should be noticed that shortly after the cells are engaged in the peripheral cutouts 23 of the carriage 10, the rollers 13 ride off the cam 105 so that the catches lock and hold the cells firmly in place. The rear track of the cam is provided with a raised portion 108 on the right hand side immediately before the line of discharge 109 of a chute 110 for receiving good battery cells. Necessarily, as the control rollers 13 pass over the raised portion 108, the catches 12 will open and discharge good cells along the chute 110. In the event that the cells tested poor, the rollers 13 come along on the front track, and the front track is provided with a raised portion 111 below the line of discharge 109 so that the catches are released at a later point. A chute 112 is provided for receiving the poor cells, and in Fig. 7 dot and dash lines 113 indicate the line of this chute. The flange 104 of the cam 14 is cut open and twisted at a point 114 and 115 respectively, after the line of discharge 109 so that as the control rollers 13 come along on the front track, they engage against the twisted portion 115 and pass through the opened portion 114 to move to the rear track of the cam. Of course, now the rollers may move to the rear track since they have already passed the line of discharge 109 representing good cells.

The loading chute 107 is supported by a bracket 116 mounted upon the table top 21. This bracket supports the chute at an inclination. The various chutes 107, 110 and 112 are formed as shown in Fig. 6, that is, they have a main wooden or other insulated central portion 117, sides 118, and tracks 119. The bodies of the cells may roll upon the tracks 119 and the ends of the cell act against the sides 118 so that they maintain their positions along the chutes. The cells cannot be short circuited even though the tracks 119 and the sides 118 are of metal in that these tracks are not connected, but are connected with the insulation member 117. A bridge 120 is connected across the chute 107 near its discharge end, and supports a finger 121 having its end 122 engaged over a small portion of the periphery of the carriage 10. This finger serves to guide or hold the battery cells against accidental falling out during the closing of the catches 12. The finger 121 is formed of two sections hingedly connected at 123 so that the front end of the finger may be moved upwards and access be had to the battery cells in the event that jamming occurs. The front end of the finger is drawn downwards by a spring 124 which connects with the front end of the finger and with a support rod 125 projecting from the bridge 120. The discharge chute 110 is supported by a bracket 126 onto the table 21. This chute is inclined downwards so that battery cells discharged on it may roll downwards. A guard 127 is arranged immediately above the chute so that if the battery cells 11 are released too early, they do not drop but are orderly discharged onto the chute. The third chute 112 is arranged beneath the table 21, and is held in place by a brace 128. A guide strip 129 extends along a short periphery of the carriage 10 so that in the event that the cells are dropped too early, they run along and are guided to the chute 112.

The operation of the machine consists in feeding battery cells 11 to the chute 107 and energizing the motor 33. Rotations from the motor are transmitted to rotate the battery cell carriage 10. The cells from the chute 107 singly engage in the cutouts 23 on the periphery of the carriage 10. The catches 12 engage the cells which are loaded onto the carriage as the control rollers 13 of the catches ride off the raised portion 105 of the cam 14.

The top cell on the battery cell carriage engages with the long contact 48, closing the circuit which energizes the ammeter for testing the strength of the cell. In the event that the strength of the cell is above that set by the pointer 56, the contacts 54 and 55 spread. In the next instant, upon further rotation of the carriage 10, the cell which is being tested closes the switch 58 and in the event that the circuit is broken at 54, 55, nothing happens and the cell may pass on. The control roller 13 of the cell rides along on the rear track of the cam, and finally such cells are discharged at the chute 110.

In the event that the cell which is under test is not of sufficient strength to move the hand 51 so that the contact between 54 and 55 is not broken, then when the body of the cell closes the switch 58, a current will flow through the relay 53. This current is very weak in that the contacts 54 and 55 bear against each other but very lightly, but the current will be sufficient to close the switch 60 of the relay so that a current of appreciable size may flow and cause the solenoid 61 to retract its core. Such retraction of the core of the solenoid pivots the lever 102 so that its extended end slides the control roller 13 to the front track of the cam 14. The roller then runs on this front track and will not cause the discharging of the particular battery cell on the chute 110, but will carry the battery cell further to a point where the control roller 13 rides upon the raised portion 111 of the cam which will cause the release of the battery cell and its discharge along the chute 112.

In this manner the machine assorts cells above the test point from cells below the test point. Since the ammeter finger 56 may be adjusted to determine the test point and since the great majority of the cells are good, they will be discharged along the chute 110 without causing any operation of the solenoid 61 or of the relay 53. It is only when the cells test poor, that the relay and the solenoid will function and use current from the battery 59. Since the poor cells are but of a small percentage of the total tested, the battery 59 will last quite a long while.

A resistance may be placed in circuit with the ammeter for changing its readings to voltages, or the ammeter may be replaced by a voltmeter. Throughout the specification where ammeter has been mentioned, this was not intended as a limitation, since quite often it is just as desirable to measure voltage as amperage. The machine may be constructed to do dual, triple or the like testing, which may be used for testing amperage, voltage and the like. To construct the machine for dual testing, all the parts shown in Fig. 9 should be duplicated, except that in lieu of the ammeter 50 a voltmeter should be used. Then as the cells move along, they will be tested first for amperage and if poor the controller rollers 13 will be moved, as before mentioned, and as the same cells advance further, they will be tested for voltage and if poor the controller rollers 13 will be moved. The machine may be wired for triple testing by merely providing three sets of parts, as illustrated in Fig. 9.

While I have illustrated and described my invention with some degree of particularity, I realize that in practice various alterations therein may be made. I therefor reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge good cells and to open the catches at their second positions to discharge poor cells at a second point.

2. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge good cells and to open the catches at their second positions to discharge poor cells at a second point, said carriage comprises a disc rotatively mounted, a ring spaced from said disc, and both disc and ring being formed with peripheral openings for the reception of the battery cells.

3. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge good cells and to open the catches at their second positions to discharge poor cells at a second point, said means for moving said carriage in a continuous path comprises a sprocket attached upon a hub supporting said carriage, and a driving system connected with said sprocket for causing its rotation.

4. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge goods cells and to open the catches at their second positions to discharge poor cells at a second point, each of said catches comprising spaced fingers pivotally mounted on said carriage, means for urging one of the ends of the fingers against the side of said cell, and a pin mounted between said fingers and supporting said movable control.

5. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge good cells and to open the catches at their second positions to discharge poor cells at a second point, each of said catches comprising spaced fingers pivotally mounted on said carriage, means for urging one of the ends of the fingers against the side of said cell, and a pin mounted between said fingers and supporting said movable control, said means for urging the fingers into engagement comprises a spring coaxially mounted on the pivot point of the fingers and acting between a bar rigidly connected with the fingers and a pin projecting from a portion of the said carriage.

6. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge good cells and to open the catches at their second positions to discharge poor cells at a second point, said cam being formed with a peripheral ridge dividing it into a front and rear track, and said ridge being formed with a passage to allow said movable controls to assume positions on one or the other of said tracks.

7. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge good cells and to open the catches at their second positions to discharge poor cells at a second point, said cam being formed with a peripheral ridge dividing it into a front and rear track, and said ridge being formed with a passage to allow said movable controls to assume positions on one or the other of said tracks, and a portion of said ridge being cut away and another portion immediately adjacent the opened space being bent off center to form a guide for moving all of the said controls to the rear track after the discharge of the cells in assorted condition.

8. A battery cell testing machine, comprising a movable cell carriage for holding a plurality of cells, means for moving said carriage in a continuous path, catches on said carriage for selectively holding said cells and each including a movable control for opening the catch, means for individually testing each cell on said carriage and moving said control when testing poor to a second position, and a cam for operating said controls to open the catches for receiving cells and to close the catches during the carrying of the cells and to open the catches past the testing point to discharge good cells and to open the catches at their second positions to discharge poor cells at a second point, said means for individually testing each cell on said carriage and moving said control when testing poor to a second position comprises a circuit including a long contact for contacting for a short period with the positive pole of the cell under test, and an ammeter with an indicating hand, a second circuit including the core of a relay, a contact on said indicating hand, a contact on a hand adjustable so that the latter contact holds the indicating hand at the testing reading, a switch closeable mechanically by the cell a short time after the cell engages said long contact, and a battery, and a third circuit including the switch of said relay, said battery and a solenoid for mechanically moving said control element.

9. A battery cell testing machine, comprising a frame supporting a horizontal rod, a disc rotative on said rod, means for driving said disc, a cam having two tracks and fixed on said rod, a ring spaced from said disc and encircling said cam, catches between said disc and ring for holding battery cells individually across these parts, resilient means urging the catches into operative positions, a roller on each catch for acting against the first track of said cam to open the catches at one point and slidable to a second position for engaging the second track of said cam to open the catches at a second point, and means for individually testing each of said cells and moving the rollers of the catches to one or the other of the tracks of said cam according to whether the cells test good or bad.

10. A battery cell testing machine, comprising a frame supporting a horizontal rod, a disc rotative on said rod, means for driving said disc, a cam having two tracks and fixed on said rod, a ring spaced from said disc and encircling said cam, catches between said disc and ring for holding battery cells individually across these parts, resilient means urging the catches into operative positions, a roller on each catch for acting against the first track of said cam to open the catches at one point and slidable to a second position for engaging the second track of said cam to open the catches at a second point, and means for individually testing each of said cells and moving the rollers of the catches to one or the other of the tracks of said cam according to whether the cells test good or bad, said cam being formed with a passage between the two tracks so that said means can move the controls from one to the other of the tracks.

11. A battery cell testing machine, comprising a frame supporting a horizontal rod, a disc rotative on said rod, means for driving said disc, a cam having two tracks and fixed on said rod, a ring spaced from said disc and encircling said cam, catches between said disc and ring for holding battery cells individually across these parts, resilient means urging the catches into operative positions, a roller on each catch for acting against the first track of said cam to open the catches at one point and slidable to a second position for engaging the second track of said cam to open the catches at a second point, and means for individually testing each of said cells and moving the rollers of the catches to one or the other of the tracks of said cam according to whether the cells test good or bad, said tracks having raised portions to open said catches so as to discharge the cells at one point or at the second point.

12. A battery cell testing machine, comprising a frame supporting a horizontal rod, a disc rotative on said rod, means for driving said disc, a cam having two tracks and fixed on said rod, a ring spaced from said disc and encircling said cam, catches between said disc and ring for holding battery cells individually across these parts, resilient means urging the catches into operative positions, a roller on each catch for acting against the first track of said cam to open the catches at one point and slidable to a second position for engaging the second track of said cam to open the catches at a second point, and means for individually testing each of said cells and moving the rollers of the catches to one or the other of the tracks of said cam according to whether the cells test good or bad, said tracks having raised portions to open said catches so as to discharge the cells at one point or at the second point and said cam also having a guide portion for returning the control rollers of the catches from the second track back to the first track after the assortment of the cells.

13. A battery cell testing machine, comprising a frame supporting a horizontal rod, a disc rotative on said rod, means for driving said disc, a cam having two tracks and fixed on said rod, a ring spaced from said disc and encircling said cam, catches between said disc and ring for holding battery cells individually across these parts, resilient means urging the catches into operative positions, a roller on each catch for acting against the first track of said cam to open the catches at one point and slidable to a second position for engaging the second track of said cam to open the catches at a second point, and means for individually testing each of said cells and moving the rollers of the catches to one or the other of the tracks of said cam according to whether the cells test good or bad, said disc and ring being formed with peripheral openings for receiving the battery cells, and said openings being shaped so that one of their sides snugly engages against the battery cells and the other is out of contact to permit rolling of the cells upon discharge.

14. A battery cell testing machine, comprising a frame supporting a horizontal rod, a disc rotative on said rod, means for driving said disc, a cam having two tracks and fixed on said rod, a ring spaced from said disc and encircling said cam, catches between said disc and ring for holding battery cells individually across these parts, resilient means urging the catches into operative positions, a roller on each catch for acting against the first track of said cam to open the catches at one point and slidable to a second position for engaging the second track of said cam to open the catches at a second point, and means for individually testing each of said cells and moving the rollers of the catches to one or the other of the tracks of said cam according to whether the cells test good or bad, said means for urging the catches into operative positions comprising springs acting between the catches and said disc.

15. A battery testing machine, comprising a frame supporting a horizontal rod, a disc rotative on said rod, means for driving said disc, a cam having two tracks and fixed on said rod, a ring spaced from said disc and encircling said cam, catches between said disc and ring for holding battery cells individually across these parts, resilient means urging the catches into operative positions, a roller on each catch for acting against the first track of said cam to open the catches at one point and slidable to a second position for engaging the second track of said cam to open the catches at a second point, and means for individually testing each of said cells and moving the rollers of the catches to one or the other of the tracks of said cam according to whether the cells test good or bad, said latter means including a pivoted lever with a raised end engageable behind said rollers, and a solenoid connected at the other end for pivoting the lever to move the rollers.

16. In a battery cell testing machine, a moving carriage for supporting cells, a moveable control for determining the point of discharge of cells from said carriage, a long contact for contacting with the positive terminal of the cell being tested as the cell moves along with said carriage, a circuit including said cell and an ammeter having a moving hand, an adjustable finger on the ammeter and carrying a contact engageable with a contact on said hand for holding the hand adjusted on the ammeter scale to the testing reading, a circuit including the latter two contacts and the coil of a relay, and another circuit including the switch of said relay and a solenoid for moving said control and capable of carrying a larger amperage than passes through the contacts on said hand and finger for powerful control of said solenoid and a second switch, and means for closing said latter switch immediately after the positive terminal of the cell makes contact with said long contact.

17. In a battery cell testing machine, a moving carriage for supporting cells, a long contact for contacting with the positive terminal of the cell being tested as the cell moves along with said carriage, a circuit including said cell and an ammeter having a moving hand, an adjustable finger angularly positionable on the ammeter and controlled frictionally with a screw and carrying a contact engageable with a contact on said hand for holding the hand adjusted on the ammeter scale to the test reading, a circuit including the latter two contacts and the coil of a relay, and another circuit including the switch of said relay and a solenoid for moving said controls and capable of carrying a larger amperage than passes through the contacts on said hand and finger for control of said solenoid and a second switch, and means for closing said latter switch immediately after the positive terminal of the cell makes contact with said long contact.

18. In a battery cell testing machine, a moving carriage for supporting cells, a long contact for contacting with the positive terminal of the cell being tested as the cell moves along with said carriage, a circuit including said cell and an ammeter having a moving hand, an adjustable finger on the ammeter and carrying a contact engageable with a contact on said hand for holding the hand adjusted on the ammeter scale to the test reading, a circuit including the latter two contacts and the coil of a relay, and another circuit including the switch of said relay and a solenoid for moving said controls and capable of carrying a larger amperage than passes through the contacts on said hand and finger for control of said solenoid and a second switch, and means for closing said latter switch immediately after the positive terminal of the cell makes contact with said long contact comprising a star wheel rotatively mounted on a pivotal supported member and in the path of motion of the cells, means for urging the member into a neutral position, and said latter switch comprising a contact on said member and a coactable contact stationarily supported from the member so that the circuit is closed upon the lifting of the star wheel due to the passage of a cell.

Signed at New York, in the county of New York and State of New York, this 29th day of September, A. D. 1930.

ALFRED SCHMIDT.